United States Patent [19]

Clement et al.

[11] Patent Number: 5,434,111

[45] Date of Patent: Jul. 18, 1995

[54] LEAD- AND BARIUM-FREE CRYSTAL GLASS HAVING HIGH OPTICAL TRANSMISSION

[75] Inventors: Marc Clement; Peter Brix; Ludwig Gaschler, all of Mainz, Germany

[73] Assignee: Schott Glaswerke, Mainz, Germany

[21] Appl. No.: 45,074

[22] Filed: Apr. 12, 1993

[30] Foreign Application Priority Data

Apr. 10, 1992 [DE] Germany ............. 42 12 092.6
Feb. 6, 1993 [DE] Germany ............. 43 03 474.8

[51] Int. Cl.⁶ .................. C03C 3/087; C03C 3/097
[52] U.S. Cl. ........................ 501/63; 501/70; 501/903
[58] Field of Search ........... 501/63, 70, 903, 67, 501/57, 58, 59, 65

[56] References Cited

U.S. PATENT DOCUMENTS

| | | | |
|---|---|---|---|
| 2,901,365 | 8/1959 | Seymour et al. | 501/66 |
| 3,013,888 | 12/1961 | de Lajarte | 501/67 X |
| 4,012,131 | 3/1977 | Krohn et al. | 351/159 |
| 4,036,623 | 7/1977 | Deeg et al. | 65/30.14 |
| 4,264,131 | 4/1981 | Sawamura et al. | 501/67 X |
| 4,367,012 | 1/1983 | Ikeda et al. | 501/67 X |
| 4,562,161 | 12/1985 | Mennemann et al. | 501/59 |
| 4,701,425 | 10/1987 | Baker et al. | 501/70 |
| 5,300,467 | 4/1994 | Ishizaki et al. | 501/67 |
| 5,320,985 | 6/1994 | Enomoto | 501/57 |

FOREIGN PATENT DOCUMENTS

| | | | |
|---|---|---|---|
| 0614373 | 2/1961 | Canada | 501/59 |
| 0151346 | 8/1985 | European Pat. Off. | 501/903 |
| 0547263 | 6/1993 | European Pat. Off. | |
| 55-37431 | 3/1980 | Japan . | |
| 2034300 | 6/1980 | United Kingdom | 501/67 |
| 2115403 | 9/1983 | United Kingdom | 501/63 |
| 92/19559 | 11/1992 | WIPO . | |

OTHER PUBLICATIONS

Chemical Abstracts, 93(10):100398z (Sep. 8, 1980).

*Primary Examiner*—Mark L. Bell
*Assistant Examiner*—David R. Sample
*Attorney, Agent, or Firm*—Millen, White, Zelano, & Branigan

[57] ABSTRACT

Lead- and barium-free crystal glass for the production of high-quality glasses and domestic articles, having high optical transmission, a refractive index $n_D$ of greater than 1.52, a density of at least 2.45 g/cm³, high hydrolytic resistance, good solarization resistance, and a $K_2O + ZnO$ content of greater than 10% by weight, the glass system being based on an alkali-lime-silicate glass containing $TiO_2$, $ZrO_2$, $Nb_2O_3$ and possibly $Ta_2O_5$ and/or combinations thereof.

15 Claims, No Drawings

LEAD- AND BARIUM-FREE CRYSTAL GLASS HAVING HIGH OPTICAL TRANSMISSION

The invention relates to a lead- and barium-free crystal glass for the production of high quality glasses and domestic articles, having an optical transmission of at least 85%, a refractive index $n_D$ of greater than 1.52, a density of at least 2.45 g/cm$^3$, a K$_2$O+ZnO content of greater than 10% by weight, a high hydrolytic resistance, and good solarization resistance.

Background of the Invention

Attempts have already been made to replace lead and barium in crystal glasses or lead crystal glasses by other substances, since lead and barium, even in very small amounts, as, for example, can be leached from such glasses after only a short time, pose a risk of toxic effects on the human organism.

An obvious step in these attempts was to produce high-refraction ($n_D$=1.74), colorless glasses by adding titanium dioxide (in some cases up to almost 50% by weight) with its high refractive index.

However, the attempts failed since these glasses with a high titanium content have a grinding hardness which is too high for crystal glass and poor acid polishability.

Glasses which are to satisfy the German Crystal Glass Characterisation Law of 25 Jun. 1971, Bundesgesetzblatt No. 59, p. 857, of 30 Jun. 1971, must contain a minimum of 10% by weight of PbO, BaO, K$_2$O and ZnO, alone or in combination, have a density of 2.45 g/cm$^3$ and have a refractive index $n_D$ of at least 1.520.

If the crystal glass or lead crystal glass is required to be lead- and barium-free, the legal requirement can be satisfied only by the corresponding amounts of ZnO and K$_2$O.

Although the use of K$_2$O in relatively large amounts increases the meltability of the glasses, it has, on the other hand, adverse effects on the chemical resistance of these glasses. Furthermore, there are indications that ZnO up to contents of $\approx$10% by weight reduces, in comparison with CaO, the chemical resistance to caustic lye and sodium phosphate. For a crystal glass, this would mean that it has low resistance with respect to resistance to alkaline and phosphate-containing detergents. Furthermore, contents of ZnO increase the scratch hardness of glasses, increasing the grinding hardness of the glasses, which is likewise undesired if the crystal glasses are to be ground.

In addition, there is a risk that the ZnO raw materials may contain significant amounts of CdO. CdO is highly toxic even in low concentrations.

A further requirement of high-quality crystal glass is the property that it does not discolor on exposure to short-wave radiation, (for example UV radiation), i.e., does not solarize.

Solarization here is taken to mean the property of a glass to discolor on exposure to sunlight. The high-energy UV component of sunlight, in particular, plays an important part here and causes a decrease in transmission in these glasses, in particular beyond a wavelength of 380 nm, which is regarded as the UV limit of visible light. The reduction in transmission beyond this limit is unimportant for the color impression of the glass, since it relates to a spectral region to which the eye is insensitive. However, fringes of this reduction in transmission can extend into the visible region of light, which then results in an interfering discoloration of the glasses. In the case of the high-quality crystal glasses according to the invention, it can be assumed that, under the irradiation conditions selected, a reduction in transmission of 3% at a wave-length of 380 nm should not be exceeded.

U.S. Pat. No. 2,901,365 discloses a glass having a density of 2.55-2.65 g/cm$^3$ and a refractive index $n_D$ of 1.56-1.58, which is principally composed of the following constituents (% by weight): 58-64 SiO$_2$; 0-17.5 Na$_2$O; 0-15.5 K$_2$O; 0-5 Li$_2$O; $\Sigma$ of the alkali metal oxides 12.5-17.5; 7.5-14 of the alkaline earth metal oxides selected from CaO and CaO+MgO; 5-9 TiO$_2$; 0-10 B$_2$O$_3$; 0-3 Al$_2$O$_3$, the principal constituents plus small amounts of coloring compounds adding up to 100% by weight in the glass.

The object of this U.S. Pat. No. 2,901,365 is to provide ophthalmic glasses, i.e., spectacle glasses, which are light and have a relatively high refractive index.

These glasses are in an alkali-lime-silicate system, to which TiO$_2$ must be added in order to ensure the low density of the glasses and to achieve a high refractive index.

To this end, at least 5% by weight of TiO$_2$ must be added to the glass, since less TiO$_2$ is insufficient to achieve the object.

These glasses contain no ZrO$_2$, Nb$_2$O$_3$ or Ta$_2$O$_5$.

U.S. Pat. No. 4,036,623 discloses a process for the chemical hardening of an ophthalmic crown glass, having the composition SiO$_2$ 2 60-75; Na$_2$O 5-10; K$_2$O 5-10; CaO 7-15; LiO 0-5; MgO 0-2; ZnO 2-8; Al$_2$O$_3$ 0-7; ZrO$_2$ 0-2; TiO$_2$ 0-2; Sb$_2$O$_3$ 0-2; CeO$_2$ 0-4.5; As$_2$O$_3$ 0-1.5, these glasses then being heat-treated and immersed into a heated salt bath.

This U.S. patent relates to a process for improving the use properties of spectacle glasses, glasses for sunglasses, and similar ophthalmic lenses by chemical hardening by means of ion exchange.

This starting glass according to U.S. Pat. No. 4,036,623 must contain at least 2% by weight of ZnO and at most 10% by weight of K$_2$O. However, a content of ZnO is undesirable precisely in crystal glasses, firstly due to the consequently increased grinding hardness and secondly due to possible CdO contamination by the ZnO raw materials.

In addition, as stated above, ZnO considerably reduces the resistance to alkaline and phosphorus-containing detergents.

Neither does the glass contain any Nb$_2$O$_5$.

Neither the density of at least 2.45 g/cm$^3$ nor the refractive index of greater than 1.52, both of which are required of crystal glass, are achieved by the majority of the glass compositions indicated here.

The object of the invention is to provide a lead- and barium-free crystal glass for the production of high-quality, absolutely toxicologically acceptable glasses and domestic articles having high optical transmission, high hydrolytic resistance and very low tendency toward solarization, and which satisfies the legal requirements.

The term lead- and barium-free is taken to mean that no compounds of lead or barium are added to the glass batch. However, it is possible, in spite of all precautions, for Pbo and BaO impurities to be introduced into the glass in amounts of up to about 100 ppm or 0.1% by weight.

SUMMARY OF THE INVENTION

The objects of the invention are described above and are achieved by crystal glasses according to the following compositions:

| | | |
|---|---|---|
| (A) | $SiO_2$ | 50–75 |
| | $Na_2O$ | 2–15 |
| | $K_2O$ | 5–15 |
| | $CaO$ | 3–12 |
| | $B_2O_3$ | 0–10 |
| | $Al_2O_3$ | 0–5 |
| | $Li_2O$ | 0–5 |
| | $MgO$ | 0–5 |
| | $SrO$ | 0–7 |
| | $ZnO$ | 0–7 |
| | $TiO_2$ | 0–8 |
| | $ZrO_2$ | 0–5 |
| | $Nb_2O_5$ | 0.1–5 |
| | $Ta_2O_5$ | 0–5 |
| | F | 0–2, |
| and | | |
| (B) | $SiO_2$ | 50–75 |
| | $Na_2O$ | 6–12 |
| | $K_2O$ | 10–15 |
| | $CaO$ | 3–12 |
| | $B_2O_3$ | 0–10 |
| | $Al_2O_3$ | 0.4–3 |
| | $Li_2O$ | 0–5 |
| | $MgO$ | 0–5 |
| | $SrO$ | 0–7 |
| | $ZnO$ | 0–7 |
| | $TiO_2$ | 0.3–8 |
| | $ZrO_2$ | 0–5 |
| | $Nb_2O_5$ | 0–5 |
| | $Ta_2O_5$ | 0–5 |
| | F | 0–2 |
| and | | |
| (C) | $SiO_2$ | 50–75 |
| | $Na_2O$ | 6–12 |
| | $K_2O$ | 10–15 |
| | $CaO$ | 3–12 |
| | $B_2O_3$ | 0–10 |
| | $Al_2O_3$ | 0.4–3 |
| | $Li_2O$ | 0–5 |
| | $MgO$ | 0–5 |
| | $SrO$ | 0–7 |
| | $ZnO$ | 0–7 |
| | $TiO_2$ | 0–8 |
| | $ZrO_2$ | 0.3–5 |
| | $Nb_2O_5$ | 0–5 |
| | $Ta_2O_5$ | 0–5 |
| | F | 0–2. |

The glass system is based on an alkali-lime-silicate glass. Alkali-lime-silicate glasses as the prior art have long been known as toxicologically acceptable glasses.

In glass composition (A), the sum of $TiO_2 + ZrO_2 + Nb_2O_5 + Ta_2O_5$ can be between 3.0% and 12% by weight and the sum of alkali metals can be greater than 15% by weight. In glass composition (B), the sum of $TiO_2 + ZrO_2 + Nb_2O_5 + Ta_2O_5$ can be between 3.0% and 12% by weight. In glass composition (C), the sum of $TiO_2 + ZrO_2 Nb_2O_5 + Ta_2O_5$ can be between 0.4% and 12% by weight.

$SiO_2$ functions in glass as a network former and can be replaced within certain limits by other known network formers, such as, for example, $B_2O_3$, without any significant changes with respect to the glass stability taking place.

The lime content functions as a network modifier, it being possible for this to be replaced by other divalent network modifiers in the range according to the invention, for example by MgO, SrO or ZnO. However, the opportunity to introduce MgO is limited, since introduction of MgO significantly increases the devitrification behavior which has an adverse effect on the producibility of these glasses. SrO and ZnO as a replacement for CaO can likewise be introduced into the glass within the stated limits without risk. The amount of alkali metals used can be freely selected within the range according to the invention, but with the restriction that the legal provisions for "crystal glass characterization" are satisfied.

A certain fluoride content for improving the transmission in the UV region and for supporting refining can be introduced into the glass batch, for example as $CaF_2$.

The use of $Li_2O$ is restricted to the range according to the invention, since this component likewise greatly increases the devitrification tendency of the glasses.

The use of alkali metals must not exceed the range proposed according to the invention, since increasing alkali metal content is accompanied by an increase in thermal expansion and thus a reduction in the temperature shock resistance of the glasses.

Particularly advantageous contents according to the present invention have been found to be 10–15% by weight of $K_2O$ and 6–12% by weight of $Na_2O$, at the same time as 7–12% by weight of CaO.

On the other hand, an alkali metal content lower than the stated range results in very high viscosity of the glasses, which would cause high melting costs and make production much more difficult.

If no ZnO is used, a content of at least 10% by weight of $K_2O$ must be introduced in order to satisfy legal requirements. This may have a significant adverse effect on the chemical properties of the glasses unless, as proposed according to the invention, it is countered by means of $TiO_2$, $ZrO_2$ or $Nb_2O_5$. Addition of $Ta_2O_5$ in the range proposed according to the invention also acts in this way.

Since the components $Ta_2O_5$ and $Nb_2O_5$ are very expensive, the components $TiO_2$ and $ZrO_2$ are preferred.

The targeted use of precisely these components is of particular importance in the preferred selection of the inventive glass composition for achieving the object set.

Since these components increase not only the refractive index but also the chemical resistance and hardness of glasses, their use is restricted to the limits mentioned in the invention.

If the proportion of these components is chosen to be greater than proposed according to the invention, the glasses are hardly economic to process since the grinding hardness has attained an intolerable level, and acid polishing of the glasses is only possible with great difficulty.

However, if the proportion is chosen too low, the glasses have low chemical resistance. Particularly in the case of relatively rough cleaning processes, for example in dishwashers, undesired changes in the glass, even destruction of the glass, can occur.

The invention preferably employs the components $TiO_2$ and $ZrO_2$ together in amounts of at least 0.3% by weight. This has the advantage that, for approximately the same mode of action on the optical properties and the brilliance of the glasses, in total less of the reduction-sensitive $TiO_2$ can be used. In addition, $TiO_2$ greatly increases the UV absorption of the glasses.

However, since $TiO_2$ increases, in particular, the acid resistance of glasses and $ZrO_2$ the caustic lye resistance, the damaging effect of high alkali metal contents on the chemical properties can be countered in an inventive manner by adding these two oxides.

At the same time, the components, in particular the component TiO₂, has a protective action against undesired and interfering solarization.

The glass also contains 0.4–3.0% by weight of Al₂O₃. This addition increases the thermal and mechanical resistance. In particular, even small added amounts of this oxide result in a reduction in corrosion of the refractory lining in the melting units, allowing the amount of interfering impurities from these lining materials, for example Fe₂O₃, to be reduced.

The novel range of the crystal glass composition has been selected in such a manner as to give, overall, optimum properties with respect to the requirements made of the glass.

Trials have shown that particularly preferred compositions comprise 66–69% by weight of SiO₂, 0.45–1.0% by weight of Al₂O₃, 7.6–10.6% by weight of Na₂O, 10.0–12.5% by weight of K₂O, 8–11% by weight of CaO, 0.8–1.6% by weight of TiO₂ and 1.2–2.5% by weight of ZrO₂, or 66–69% by weight of SiO₂, 0.45–1.0% by weight of Al₂O₃, 7.6–11% by weight of Na₂O, 10–12.5% by weight of K₂O, 4–7% by weight of CaO, 1.5–2.5% by weight of TiO₂ and 1.2–2.5% by weight of ZrO₂.

It must be ensured that the content of TiO₂, ZrO₂ or Ta₂O₅, alone or in total, should be at most 4% by weight, since otherwise the processing and use properties of the glasses are impaired.

All glass compositions contain refining aids, for example Sb₂O₃, up to a content of 1% by weight, and they may contain conventional amounts of up to 100 ppm of decolorizers, such as, for example, CoO, NiO or Nd₂O₃, depending on the purity of the starting raw material.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever.

In the foregoing and in the following examples, all temperatures are set forth uncorrected in degrees Celsius; and, unless otherwise indicated, all parts and percentages are by weight.

The entire disclosures of all applications, patents and publications, cited above and below, and of German Application Nos. P 42 12 092.6 and P 43 03 474.8, filed Apr. 10, 1992, and Feb. 6, 1993, respectively, are hereby incorporated by reference.

In order to illustrate the invention further, the glass compositions and properties of 11 glasses according to the invention melted therefrom are summarised in Table I, II and III.

The melt examples were molten without decolorisers. In addition, raw materials were employed which cause BaO and/or PbO contamination of at most 50 ppm in the molten glass. The content of Fe₂O₃ in the glasses is less than 150 ppm. No other coloring transition metals were detectable in the glasses.

In addition to the refractive index, the optical transmission in accordance with DIN 67507 and the standard chromaticity coordinates x and y in accordance with DIN 5033 for a glass thickness of 11 mm are shown. The optical transmission in the example tables is given in parts of 100 (%) for standard illuminant C and a 2° observer. The measurements were carried out using a Perkin-Elmer Lambda 9 spectrophotometer additionally equipped with an integrating globe ("Ulbricht globe") in order to reduce measurement errors caused by sample inhomogeneities. The measurement values indicated have a measurement error of ±0.5%.

The solarization resistance is tested by means of a Heraeus "SUNTEST CPS" accelerated exposure instrument. The sample is irradiated by an Xe lamp having a power of 1.8 kW and a maximum irradiation strength (<λ800 nm; filter system: "max UV") of 765 W/m² for a period of 121 hours. The distance between lamp and sample is 19 cm. A quartz glass bowl with an IR-reflecting coating is installed between lamp and sample at the point provided in the instrument, preventing undesired heating of the sample. During the irradiation, a temperature of 40° C. at the sample is not exceeded. The irradiation is carried out on samples having a glass thickness of 5 mm, and the spectral transmission is measured at a wavelength of 380 nm before and after the irradiation.

The difference in the transmission before and after the irradiation is shown in parts of 100 (%) in the "Suntest" line. Measurements were carried out using the abovementioned spectrophotometer. The measurement values shown have a measurement error of ±0.5%. In addition, the density of the glasses and the hydrolytic resistance classes in accordance with DIN 12111 are shown.

In Example 3, oxides were partially replaced by fluorides. F₂—O in this example shows the proportion of oxygen atoms replaced by fluorine. The F₂—O data make it possible to standardize the examples to 100% when fluorine is employed.

The conversion factor for converting the proportion by weight of F into the F₂—O value is calculated from the following formula:

$$F_2 - O = F \cdot \frac{(2 \times 19) - 16}{2 \times 19}$$

$$F_2 - O = F \cdot 0.579$$

TABLE 1

| Component | 1 | 2 | 3 | 4 |
|---|---|---|---|---|
| SiO₂ | 68.29 | 67.94 | 67.81 | 67.31 |
| Al₂O₃ | 0.68 | 0.63 | 0.60 | 0.86 |
| Li₂O | | | | 0.83 |
| Na₂O | 7.50 | 8.97 | 7.51 | 7.35 |
| K₂O | 12.08 | 10.21 | 11.70 | 10.13 |
| CaO | 8.98 | 9.36 | 9.15 | 12.25 |
| TiO₂ | 2.12 | | 1.21 | 0.94 |
| ZrO₂ | | 2.56 | 1.48 | |
| F₂—O | | | 0.20 | |
| Sb₂O₃ | 0.34 | 0.34 | 0.34 | 0.34 |
| F₂ | | | 0.35 | |
| Optical values: | | | | |
| n_D | 1.530 | 1.531 | 1.531 | 1.534 |
| x | 0.3109 | 0.3109 | 0.3109 | 0.3109 |
| y | 0.3179 | 0.3180 | 0.3180 | 0.3179 |
| τ (%) | 90.4 | 90.2 | 90.3 | 90.3 |
| Suntest (%) | ±0 | −2.5 | −1.0 | −0.5 |
| Physical values: | | | | |
| ρ | 2.52 | 2.56 | 2.55 | 2.55 |
| Chemical data: | | | | |
| Hydrolytic class | 4 | 4 | 4 | 4 |

TABLE 2

| Component | 5 | 6 | 7 | 8 |
|---|---|---|---|---|
| SiO₂ | 65.90 | 67.90 | 67.27 | 66.19 |
| Al₂O₃ | 1.94 | 0.67 | 0.68 | 0.92 |

TABLE 2-continued

| Component | 5 | 6 | 7 | 8 |
|---|---|---|---|---|
| $Na_2O$ | 8.27 | 8.59 | 8.85 | 7.61 |
| $K_2O$ | 10.29 | 10.15 | 10.69 | 12.21 |
| MgO | 1.64 | | | |
| CaO | 10.77 | 7.30 | 9.28 | 7.07 |
| SrO | | 4.19 | | |
| ZnO | | | | 4.72 |
| $TiO_2$ | 0.48 | 0.48 | | 0.94 |
| $ZrO_2$ | 0.38 | 0.38 | | |
| $Nb_2O_5$ | | | 2.89 | |
| $Sb_2O_3$ | 0.34 | 0.34 | 0.34 | 0.34 |
| Optical values: | | | | |
| $n_D$ | 1.531 | 1.527 | 1.531 | 1.528 |
| x | 0.3110 | 0.3107 | 0.3107 | 0.3108 |
| y | 0.3183 | 0.3177 | 0.3178 | 0.3178 |
| τ (%) | 90.3 | 90.4 | 90.2 | 90.3 |
| Suntest (%) | −1.5 | −1.0 | −1.5 | −0.5 |
| Physical values: | 2.55 | 2.57 | 2.55 | 2.57 |
| ρ | | | | |
| Chemical data: | 3 | 4 | 4 | 4 |
| Hydrolytic class | | | | |

TABLE 3

| Component | 9 | 10 | 11 |
|---|---|---|---|
| $SiO_2$ | 66.02 | 62.09 | 63.46 |
| $B_2O_3$ | 2.00 | 1.71 | 1.71 |
| $Al_2O_3$ | 0.60 | 2.82 | 0.68 |
| $Na_2O$ | 8.75 | 3.79 | 3.86 |
| $K_2O$ | 10.43 | 14.29 | 14.45 |
| CaO | 9.18 | 4.36 | 4.93 |
| $TiO_2$ | 1.21 | 7.23 | 7.21 |
| $ZrO_2$ | 1.48 | 3.19 | 3.18 |
| $Sb_2O_3$ | 0.34 | 0.52 | 0.52 |
| Optical values: | | | |
| $n_D$ | 1.536 | 1.559 | 1.561 |
| x | 0.3109 | 0.3139 | 0.3125 |
| y | 0.3179 | 0.3224 | 0.3201 |
| τ (%) | 90.4 | 88.8 | 89.3 |
| Suntest (%) | −1.0 | ±0 | ±0 |
| Physical values: | 2.57 | 2.60 | 2.60 |
| ρ | | | |
| Chemical data: | 4 | 2 | 3 |
| Hydrolytic class | | | |

The glass compositions of this invention can be formed into glass crystal articles of manufacture by conventional, well-known processes. Such articles of manufacture are those formerly made, for example, of lead crystal glass, including but not limited to stemware, barware, bowls, pitchers, objects of art, etc.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

We claim:

1. A lead- and barium-free crystal glass suitable for the production of glasses and domestic articles, said glass consisting essentially of (in % by weight, based on oxide):

| $SiO_2$ | 50–75 |
|---|---|
| $Na_2O$ | 2–15 |
| $K_2O$ | 5–15 |
| CaO | 3–12 |
| $B_2O_3$ | 0 |
| $Al_2O_3$ | 0–5 |
| $Li_2O$ | 0–5 |
| MgO | 0–5 |
| SrO | 0–7 |
| ZnO | 0–7 |
| $TiO_2$ | 0–8 |
| $ZrO_2$ | 0–5 |
| $Nb_2O_5$ | 0.1–5 |
| $Ta_2O_5$ | 0–5 |
| F | 0 | wherein the sum of $TiO_2+ZrO_2+Nb_2O_5+Ta_2O_5$ is between 0.3% and 12% by weight and wherein the sum of the alkali metals is greater than 15% by weight, said glass having an optical transmission of at least 85%, a refractive index $n_D$ of greater than 1.52, a density of at least 2.45 g/cm$^3$, and a $K_2O+ZnO$ content of greater than 10% by weight.

2. A lead- and barium-free crystal glass according to claim 1, having the following contents (in % by weight):

| $K_2O$ | 10–15; |
|---|---|
| $Na_2O$ | 6–12; and |
| CaO | 7–12. |

3. A lead- and barium-free crystal glass according to claim 1, having an $Al_2O_3$ content of 0.4–3.0% by weight.

4. A lead- and barium-free crystal glass according to claim 1, having a CaO content of 7–12% by weight.

5. A glass according to claim 1, wherein the total content of $TiO_2$ and $ZrO_2$ is at least 0.3% by weight.

6. A glass according to claim 1, wherein the $Li_2O$ content is 0.

7. A glass according to claim 1, wherein said glass has a refractive index $n_D$ of >1.52–1.536.

8. A lead- and barium-free crystal glass according to claim 7, having the following contents (in % by weight):

| $K_2O$ | 10–15; |
|---|---|
| $Na_2O$ | 6–12; and |
| CaO | 7–12. |

9. A lead- and barium-free crystal glass according to claim 7, having an $Al_2O_3$ content of 0.4–3.0% by weight.

10. In a crystal glass article of manufacture, the improvement wherein said article is manufactured from a composition according to claim 7.

11. A glass according to claim 7, wherein the total content of $TiO_2$ and $ZrO_2$ is at least 0.3% by weight.

12. A glass according to claim 1, wherein said glass contains 10–15 wt. % $K_2O$.

13. A glass according to claim 1, wherein the $TiO_2$ content is 0 and the sum of alkali metals is greater than 15% by weight.

14. A glass according to claim 1, wherein the $K_2O$ content is 10.69–15 wt. % and the sum of alkali metals is greater than 15% by weight.

15. In a crystal glass article of manufacture, the improvment wherein said article is manufactured form a composition according to claim 1.

* * * * *